United States Patent [19]
Moore

[11] Patent Number: 4,649,333
[45] Date of Patent: Mar. 10, 1987

[54] TWO TERMINAL NICAD BATTERY CHARGER WITH BATTERY VOLTAGE AND TEMPERATURE SENSING

[75] Inventor: Derek V. Moore, Rexdale, Canada

[73] Assignee: Levitt-Safety Limited, Toronto, Canada

[21] Appl. No.: 729,156

[22] Filed: Apr. 30, 1985

[51] Int. Cl.⁴ .............................................. H02J 7/10
[52] U.S. Cl. ...................................... 320/31; 320/35; 320/39
[58] Field of Search ........................... 320/2–5, 320/35, 36, 31, 32, 39, 40; 323/906

[56] References Cited

U.S. PATENT DOCUMENTS

| | | | |
|---|---|---|---|
| 3,531,706 | 9/1970 | Mullersman | 320/20 |
| 3,614,584 | 10/1971 | Burkett et al. | 320/35 |
| 3,626,270 | 12/1971 | Burkett et al. | 320/35 |
| 3,852,652 | 12/1974 | Jasinski | 320/35 |
| 3,911,351 | 10/1975 | Saslow | 320/39 |
| 4,065,712 | 12/1977 | Godard et al. | 320/39 |
| 4,105,962 | 8/1978 | Scott, Jr. et al. | 320/32 |
| 4,125,802 | 11/1978 | Godard | 320/35 |
| 4,240,022 | 12/1980 | Kilinskis et al. | 320/23 |
| 4,291,266 | 9/1981 | Portmann | 323/906 |
| 4,370,606 | 1/1983 | Kakumoto et al. | 320/31 |
| 4,394,612 | 7/1983 | Emerle et al. | 320/31 |
| 4,424,476 | 1/1984 | Mullersman | 320/36 |

FOREIGN PATENT DOCUMENTS 2048623 10/1970 Fed. Rep. of Germany ... 320/35 X
0748663 7/1980 U.S.S.R. ............................. 320/35

Primary Examiner—R. J. Hickey
Attorney, Agent, or Firm—Finnegan, Henderson, Farabow, Garrett & Dunner

[57] ABSTRACT

Method and apparatus is disclosed for measuring battery temperature and battery voltage during battery charging. The system is designed to charge a battery using two charging terminals and sensing battery voltage and temperature through the charging terminals. In measuring the temperature of the battery, the battery is electrically isolated from the sensing circuit during a portion of the charging cycle where the charging voltage is less than the battery voltage. Should the temperature of the battery, as measured, increase to a predetermined upper limit, the charging cycle is switched to a trickle charge on the battery. The battery voltage is measured at the instant when charging voltage exceeds the battery voltage to give a true indication of the recharged potential of the battery. When the sensed battery voltage is at the desired level, charging is switched to trickle charge. The system provides battery temperature and voltage sensing by the use of two terminal battery construction which is superior to the existing three and four terminal battery charging constructions.

54 Claims, 5 Drawing Figures

FIG.1.
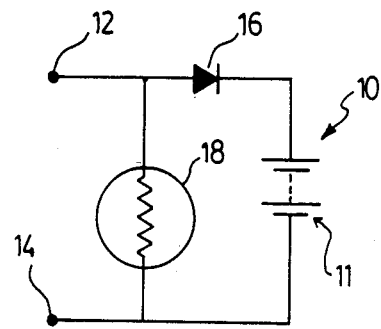
FIG.2.
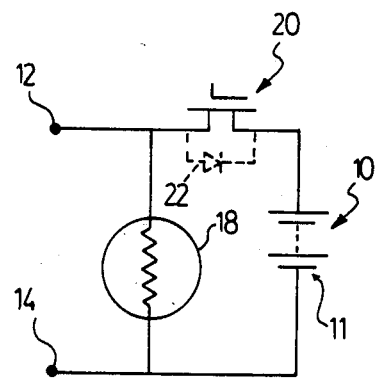
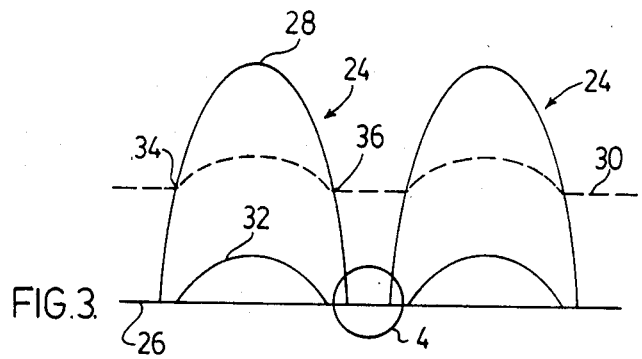
FIG.3.
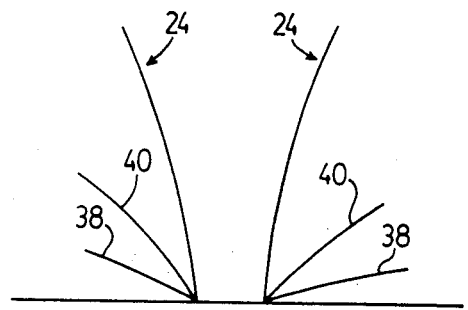
FIG.4.

TWO TERMINAL NICAD BATTERY CHARGER WITH BATTERY VOLTAGE AND TEMPERATURE SENSING

FIELD OF THE INVENTION

This invention relates to a battery charging system which measures battery temperature and voltage during the recharging cycle.

BACKGROUND OF THE INVENTION

Battery chargers are used in a variety of situations for recharging different types of rechargeable batteries of the wet and dry cell construction. It is desirable to recharge the battery as quickly as possible to ready it for its next use. During high charge rate, the battery temperature may become excessively high which can cause overheating and damage to the battery. Furthermore, the maximum voltage to which the battery is charged should be limited. It is, therefore, important to monitor the temperature and recharged potential of the battery during the charging cycle. In most instances, the temperature of the battery is more critical than the recharge voltage where in a number of instances, temperature indicates that the battery is being overcharged.

A number of systems are available which provide for recharging of batteries and, at the same time, measure voltage and temperature of the battery during the charging cycle.

It is appreciated that several battery charger systems involve the use of four-terminal constructions to provide recharging of the battery and also additional terminals for sensing and detecting battery temperature and voltage. Examples of these systems are found in U.S. Pat. Nos. 3,852,652; 4,065,712 and 4,370,606. U.S. Pat. No. 3,852,652 senses battery temperature through four terminals. The system does not sense the actual battery temperature, but instead detects a rate of change of the temperature. In this way, ambient temperature does not become a factor in determining overheating of the battery during the charging cycle. U.S. Pat. No. 4,370,606 uses a diode system as a battery temperature sensor. The system measures ambient temperature as well as battery temperature. The voltage drop across the diode system, which is changeable as a function of an ambient and battery temperature, is used in establishing battery temperature in the charging process. U.S. Pat. No. 4,065,712 is directed to rapid charging involving the use of intelligent SCR circuitry to reduce current variation with supply voltage or battery voltage. Diodes are used to measure battery temperature. The system switches to a trickle charge upon sensing that the battery is at the desired charge level.

Systems which involve three-terminal constructions for measuring temperature and/or battery voltage are disclosed in U.S. Pat. Nos. 3,531,706; 4,240,022 and 4,394,612. U.S. Pat. No. 3,531,706 discloses a three- or four-terminal device for charging a battery. The battery temperature is sensed in conjunction with battery potential and the charging cycle is switched to trickle charge when predetermined levels of temperature and/or voltage are attained. A thermal switch is used in the three terminal charging device of U.S. Pat. No. 4,240,022 to cut off the high rate of charge when the battery reaches full charge. The battery is then trickle charged for the remaining period of charging. A comparator system is used in U.S. Pat. No. 4,394,612 to determine the battery voltage when charging current is not flowing. The system requires a three-terminal charging connection which relies on current flowing out of the battery when charging current is not flowing to permit the comparator system to determine if the battery is at full charge.

Examples of two-terminal charging systems are disclosed in U.S. Pat. Nos. 3,626,270 and 3,911,351. The U.S. Pat. No. 3,626,270 is directed to the rapid charging of nickel cadmium batteries. The battery is subject to alternating charging and discharging intervals. Either battery voltage or temperature may be monitored to determine when rapid charging should cease with conversion to trickle charge. Temperature measurement, according to this disclosure, requires the use of at least one additional terminal for the temperature sensor if the battery and the charging device are not to be within chose physical proximity. U.S. Pat. No. 3,911,351 includes switches and latches which switch the charge rate for the system to a trickle charge on the battery when battery voltage or temperature exceeds predetermined upper limits. A thermal switch is used to sense battery temperature which is placed in parallel with a resistor and a capacitor. A first SCR is used to control charging of the battery while a second SCR will turn off the charging when a predetermined charge point is reached. The peak voltage across the battery during charge is measured, which results in variation in charging current. This will affect the actual battery voltage at shut-off. The circuit is designed to take a higher battery voltage when a preset temperature is reached. The charger then responds to this new voltage as though the battery were fully charged. The system is subject to errors caused by variation in charging current due to battery condition and main supply of voltage and also due to variation in battery impedance. These two-terminal systems for charging batteries do not provide for an accurate measurement of battery voltage and/or temperature during the charging cycle with resultant errors in the charging cycle which can either damage the charged battery or provide an incompletely charged battery.

SUMMARY OF THE INVENTION

According to an aspect of the invention, a two-terminal battery pack is charged by contact of the two charging terminals with corresponding terminals of a charging circuit supplying charging voltage. An electrical battery temperature measuring means is provided in association with the two charging terminals, whereby battery temperature may be measured. The improvement, according to this invention, comprises effectively electrically removing the battery from the charging terminals while electrically measuring battery temperature through the two charging terminals by the electrical measuring means.

According to another aspect of the invention, in an apparatus for charging a battery of a two-terminal battery pack, means is provided for supplying a charging voltage to the two charging terminals. Electrical means is provided for measuring battery temperature and is associated with the two charging terminals. The battery temperature measuring means includes means for sensing battery temperature. The sensing means is adjacent the battery and electrically connected to the two charging terminals during battery charging. According to this invention, the improvement comprises means for effectively electrically removing the battery from the charging terminals while the measuring means measures battery temperature by applying a voltage on said sensing means via the two charging terminals.

According to another aspect of the invention, a rechargeable battery pack having a battery and two charging terminals is provided. Electrical means responsive to change in battery temperature is associated with the two terminals of the battery pack. Means is provided for preventing discharge of the battery through the charging terminals whereby charging of the battery, monitoring of the battery temperature and monitoring of charged battery voltage during a charging cycle are accomplished solely through the two charging terminals of the battery pack.

BRIEF DESCRIPTION OF THE DRAWINGS

Preferred embodiments of the invention are shown in the drawings wherein:

FIG. 1 is a schematic of a two-terminal rechargeable battery pack with temperature sensor using a conventional diode to prevent battery discharge through the terminals;

FIG. 2 is a schematic of a two-terminal rechargeable battery pack with temperature sensor and field effect transistor to control discharge of battery through the terminals;

FIG. 3 is a graph showing voltage and current waveforms when a high rate of charge is applied to the battery;

FIG. 4 is an enlarged view of the section encircled on FIG. 3; and

DETAILED DESCRIPTION OF THE PREFERRED EMBODIMENTS

Figure 5:
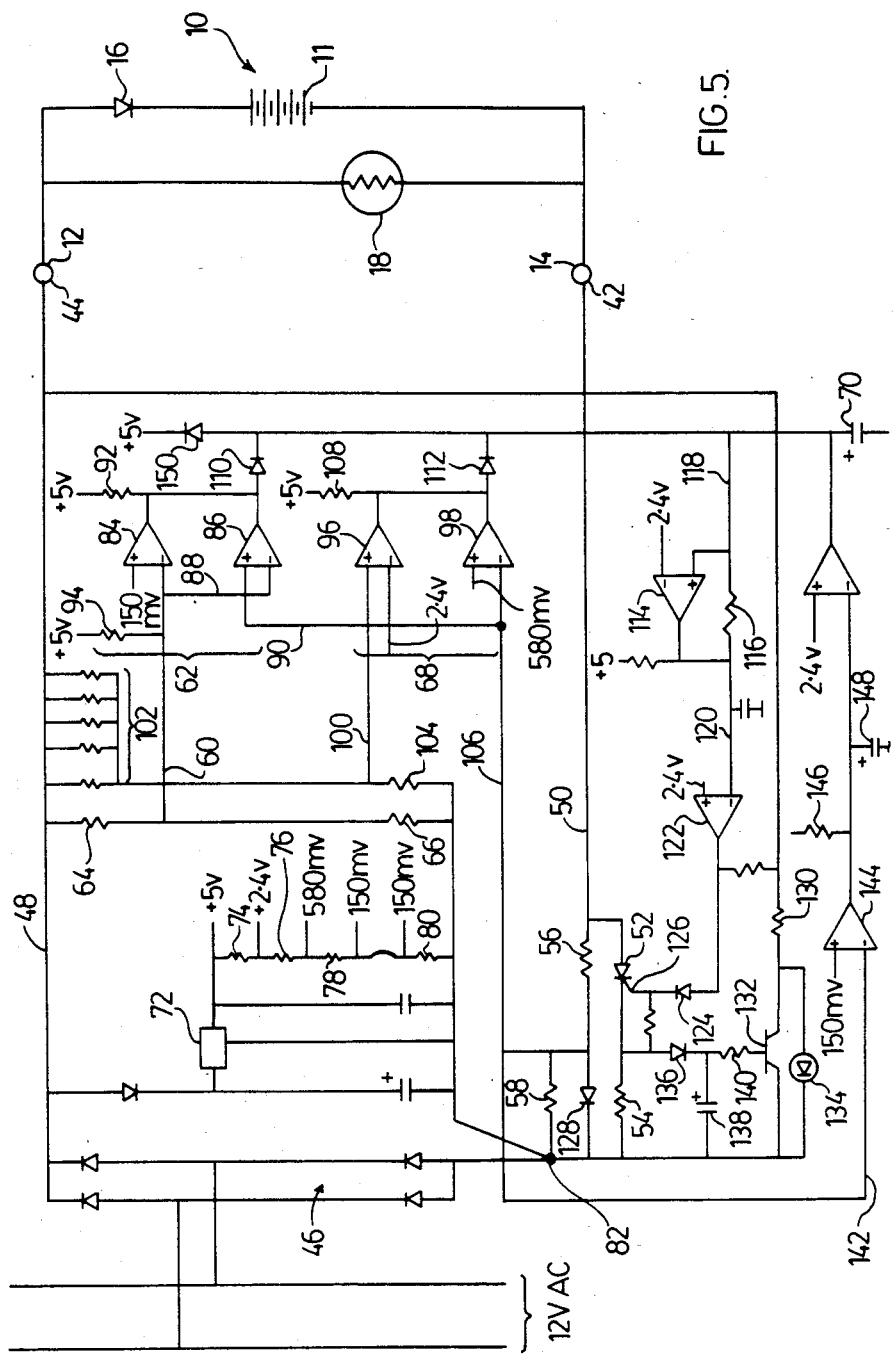
FIG. 5 is a detailed circuit diagram of the two-terminal battery charger and its associated battery.

The battery system, according to this invention, provides a two-terminal arrangement which can be charged and, optionally, discharged through the same two battery terminals. The system is adapted to sense and respond to true battery voltage regardless of the charging current and sense and respond to true battery temperature. No other connection is required in conjunction with the battery during the charging cycle to measure battery voltage and temperature. The terminals of the battery system can be rendered electrically dead when not connected to the charger to prevent accidental discharge of the battery pack.

With reference to FIG. 1, the battery pack is generally designated 10 optionally housed in an enclosure (not shown), which is waterproof, moisture proof, and is capable of containing leaked chemicals of the battery pack. External to the enclosure are two charging terminals 12 and 14. The charging system, according to this invention, is separately connected to these two terminals to effect the battery charging and at the same time, with appropriate circuitry to be discussed with respect to FIG. 5, to sense battery temperature and voltage. According to a preferred embodiment of this invention, the plurality of cells in the battery pack may be of the rechargeable nickel cadmium type, although it is appreciated that wet cells and other forms of dry cells may be used where appropriate modifications are made to the circuitry to compensate for the particular charging characteristics of those cells.

A diode 16 is provided in series between the terminals 12 and 14 in the battery pack 10. The diode 16 is arranged to prevent discharge of the battery 11 through the terminals 12, 14 either when a load is placed on terminals 12 and 14, or during the charging cycle. When using an alternating current, the battery 11 will not discharge through the terminals 12 and 14 when the charging voltage is at a level below the instantaneous voltage of the battery.

In order to sense the temperature of the plurality of batteries in the battery pack, a temperature sensing device 18 is used which, according to this particular embodiment, is a thermistor provided in parallel with the series arrangement of the diode 16 and the plurality of cells 11. The thermistor 18 is located adjacent one or more of the cells of the battery pack where its resistance value decreases as battery temperature increases. According to the circuitry of FIG. 5, provision is made to measure the change in resistance of the thermistor 18 to provide a system for detecting true battery temperature.

An alternative arrangement to circuitry of FIG. 1 involves the use of a field effect transistor 20 in series with the battery 11. The field effect transistor 20 may be controlled in a manner to prevent discharge of the battery through terminals 12 and 14 when the battery 11 is being charged. Optionally, the field effect transistor can be controlled to permit discharge of the battery 11 through terminals 12 and 14 when it senses that a load is placed on the terminals for use of battery power. The thermistor 18 is connected in parallel with the series arrangement of the field effect transistor 20 and battery 11. Thus, when the field effect transistor, which may be a VMOS FET is turned on, the battery may power electrical components through terminals 12 and 14. However, when the VMOS FET is turned off, discharge of the battery is not permitted during the charging cycle. When charging voltage is at a level above instantaneous battery voltage, the VMOS FET will allow forward conduction through the battery by use of the integral diode 22 which functions in the same manner as diode 16 of the battery pack arrangement of FIG. 1.

A variety of waveforms for the charging potential may be used in charging the battery pack 10 depending upon the type of battery, the rate of charge, and other considerations well known to those skilled in the art. With respect to FIG. 3, a rectified AC charging voltage is applied to terminals 12, 14 of the battery pack. The waveform shown in FIG. 3 is the practical waveform as a result of the diode drops in the rectifier circuit. Each waveform 24 is developed from a base line 26 of zero volts to a peak voltage at 28 which is well above the desired potential to which a battery pack is to be charged. Dashed line 30, shows the instantaneous battery voltage of battery pack 10. With reference to FIGS. 1 and 3, the current flow through diode 16 is shown by line 32 where current does not begin to flow through diode 16 until the potential of the charging voltage waveform reaches level 34. The battery voltage from point 34 increases slightly as shown in dashed line 30 and decreases again to the level at 36 at which point current 32 ceases flowing through diode 16 due to the voltage of the charging waveform dropping below the instantaneous voltage of the battery pack 10.

The intervals of the waveform, as encircled in FIG. 3, are enlarged in FIG. 4. During the period of each waveform cycle on either side of the waveform between points 34 and 36, i.e., outside the waveform envelope, the charging voltage is at a level less than the instantaneous battery voltage. During this brief time period, a very low level of current is allowed to flow through the thermistor 18. The lower line 38 indicates the current flowing through thermistor 18 when the battery pack is at a normal temperature for battery charging. Line 40 shows the minimal current flow through the thermistor 18 due to a higher battery pack temperature whereby the resistance of thermistor 18 is appreciably lower.

In accordance with this invention, upon providing a circuit, such as FIG. 1 or FIG. 2, and analyzing the waveforms of FIGS. 3 and 4, the invention hereby provides a system which is capable of measuring true battery temperature and true battery voltage through a two terminal battery pack.

Referring to FIG. 5, the battery pack 10 is illustrated with terminals 12 and 14. The thermistor 18 is located in parallel with the series arrangement for the diode 16 and the plurality of batteries within the battery pack. The charging system, according to this invention, has corresponding terminals 42 and 44 which contact the terminals 12 and 14 exterior of the battery pack 10. The battery charging circuitry is powered by an alternating current which is rectified in the diode bridge generally designated 46 to provide a full wave rectified direct current charging voltage of a waveform, as shown in FIG. 3. The AC input power is normally stepped down from the standard AC power outlet to a level which, when rectified, provides a charging voltage which is in excess of the predetermined desired voltage to which a battery is to be charged. According to this preferred embodiment, a twelve volt RMS AC is provided which, when rectified, provides a DC charging voltage having a RMS value of approximately twelve volts. The charging voltage is applied to the battery terminals 12 and 14 by lines 48 and 50. In line 50 is an SCR 52 which, when turned on, allows the charging current to pass through resistor 54 which has a relatively low value to provide for a high rate of charge.

When the battery is fully charged or its temperature is at a predetermined level and the SCR 52 is turned off, the charging current then passes through resistors 56 and diode 128 in series to provide a considerably higher resistance, thereby in providing a trickle charge on the battery pack 10. Thus, the SCR 52 provides the device for switching from high charging rate to a trickle charge on the battery when battery temperature and/or battery voltage is detected at the predetermined levels.

The thermistor 18 acts as a sensing means for sensing temperature of the plurality of batteries in the battery pack where a detectable characteristic of the thermistor, namely resistance, changes in response to either an increase or decrease in the battery temperature. It is appreciated that many electrical devices are available which can sense temperature of the battery cells, and in so doing, provide a change in a detectable characteristic of the electrical device. The charging circuitry includes a device capable of detecting the change in electrical characteristic of the sensing device. Although this may be accomplished in many ways, according to an embodiment of this invention, it is expedient to include a thermistor 18 as a leg in a Wheatstone bridge. The remaining legs of the Wheatstone bridge relative to the input 60 for the temperature measuring device 62, are made up by resistors 64, 66 and series resistors 56 and 58, but not resistor 54, because temperature sensing occurs when the charging voltage is at a level below the battery voltage whereby low current flows through the thermistor 18 as discussed with respect to FIG. 4. By way of the Wheatstone bridge, the temperature measuring device 62 can detect a change in the resistance of thermistor 18. The output of the temperature measuring device 62 can be used to switch the SCR 52 to a trickle charge mode when the resistance of thermistor 18 is dropped to a value corresponding to a predetermined temperature of the battery cells.

The voltage of the battery pack 10 can be measured by the voltage measuring device 68. The voltage measuring device 68 is adapted to detect the potential of the charging voltage in line 48 at either brief periods 34 or 36 on the waveform of FIG. 3. This occurs at the time when the charging voltage commences to flow through the diode 16 or is about to cease flowing through the diode 16.

It is appreciated that these principles of the invention in low voltage measurement of the temperature of the battery and low current measurement of the battery voltage can be applied in many ways of which the circuit of FIG. 5 is only one example. In using a rectified AC charging voltage, it is appreciated that a source of DC voltage may be used to charge the battery where the potential of the DC voltage is well above that of the battery pack. To provide for a waveform similar to that of FIG. 3, the DC voltage may be intermittently interrupted from time to time to cause a falling off and a subsequent rise in the charging voltage so that low voltage temperature measuring and low current battery measuring can be achieved by temperature and voltage measuring devices similar to that of 62 and 68 of FIG. 5.

An alternative view of the invention is to consider the charging system as a source of current which may be caused to change as a function of time, with a very low current (in either direction) being used to measure temperature, whereby the voltage drop due to this current passing through the thermistor is not sufficient to cause the diode in series with the battery to conduct, but is sufficient due to the proportionality between current and voltage to provide information about the resistance of the thermistor and thereby its temperatures. Then at a somewhat higher level of current, in a direction which would tend to charge the battery such that the voltage is sufficient to make the diode feeding the battery conduct, this voltage with predictable corrections for voltage drop across the diode may be used to obtain a value for the voltage of the battery, sensibly undisturbed by the effect of resistances in the circuit. These two above-mentioned current levels are used for the purposes of measurement, and they may be time varying and infrequent, if convenient for the particular circuit. Two other levels of current are used, substantially higher than these; a level suitable for "trickle charging" and a level for "high rate charging". Both of these would be of levels to suit the needs of a particular battery and may be of any unidirectional waveform such as pure DC, DC with an AC component, rectified AC or pulsating DC.

In general terms, the temperature and voltage measuring devices are adapted to provide "windows" during which the devices may operably and accurately measure battery temperature and battery voltage. According to this invention, the "windows" are established by using a plurality of electronic comparators which are set up to measure an electrical characteristic representative of battery voltage or temperature and also to establish the "window" in the waveform of FIG. 3, during which an accurate detection of battery voltage and/or temperature can be made. When the comparator arrangements of measuring devices 62 and 68 have determined a battery temperature and/or voltage at the predetermined levels, their outputs, either independently or in combination, charge a capacitor 70 over time. When the capacitor 70 reaches a sufficient voltage, the circuit controlling the SCR 52 is tripped to open the SCR and cause the charging voltage to pass initially through series resistors 56 and 58 and as potential rises, through diode 128 and resistor 56, thereby effecting a trickle charge on the battery pack 10. The comparator arrangements of measuring devices 62 and 68 and of the trip circuit in conjunction with the SCR 52 are provided with reference voltages by a voltage regulator 72 and a string of resistors 74, 76, 78 and 80 to provide between lines 48 and 50 through the connection at 82 the voltages as marked. These voltages are then provided to the comparator system 62, 68 and the trigger circuit comparators with the values noted at each pin of the IC's of the comparators.

The temperature measuring device 62, with the comparator arrangement and the temperature sensing device 18, functions as follows. As already noted, if the diode 16 of the battery pack were open and if the SCR 52 were open circuited, then thermistor 18, resistors 64 and 66 and series resistors 56 and 58 would form a Wheatstone bridge. At low current levels, i.e., as shown in FIG. 3 for charging voltages less than the instantaneous battery voltage, effectively current flows through thermistor 18, through resistors 56 and 58 and resistors 64 and 66. The output of the Wheatstone bridge is input to comparator 84 by line 60. The comparator 84 has a reference input voltage of 150 millivolts. The output of the comparator is free to go "high" whenever the thermistor resistance falls below a preset level as determined within the parameters of the Wheatstone bridge. This comparison, however, would be invalid whenever the supply voltage for charging the battery rises to a point where the diode 16 in the battery pack or the SCR 52 are conducting, since the Wheatstone bridge is no longer established. This condition is detected by the voltage at the junction of resistors 64 and 66 which is input at 60 to comparator 86 by additional connection 88. The other input 90 to the comparator 86 establishes the "window" during which the output of comparator 84 can affect the trip circuit. The input at 90 will be less than input 88 when low current flows through the thermistor 18 up to approximately when current commences to flow through diode 16. At this time, comparator 86 will conduct to ground and prevent the combined output of comparators 84 and 86 from rising to the potential at the outputs of the comparators as determined by resistor 92.

It is important to note that the Wheatstone bridge delivers an output which is directly proportional to the supply voltage, and which rises from zero as the supply voltage rises from zero. A comparison made at very low levels of voltage would be invalid because of the normal variation in input offset voltages at the input of the comparator. To prevent measurements from being made at low levels, one approach would be to provide a third comparator which would be connected to the outputs of comparators 84 and 86 to hold the combined output at zero whenever the voltage at the junction of resistor 64 and 66 is below a preset value. An alternative approach, as shown in FIG. 5, is to provide a resistor 94 which, relative to resistors 64 and 66 biases the voltage in line 60 upward, whenever the supply voltage is low, thereby preventing false readings due to the effect of input offset voltages.

The voltage measuring device 68 functions in a similar manner where comparator 96 measures the voltage in line 48 and comparator 98 determines the "window" during which the voltage as measured by comparator 96, is actually indicative of the battery voltage, that is, when current commences to flow through or is about to cease flowing through the diode 16. The reference voltage for comparator 96 is 2.4 volts. The input 100 to comparator 96 is a voltage tapped off of line 48 at the junction of a resistor pack 102 and resistor 104. The resistor pack 102 has a plurality of resistors which may function as a variable resistance by way of removing one or more of the resistors from the pack. The purpose of the pack 102 is to establish at the junction of resistors 102 and 104 the voltage which is representative of the desired charged voltage for the battery pack 10, which will thereby cause inversion or changing of states of comparator 96 when the voltage at input 100 exceeds 2.4 volts. When the input 100 is in excess of 2.4 volts, the comparator 96 goes high. To prevent a false reading of battery voltage, comparator 98 maintains the output of comparator 96 low whenever the voltage across resistors 56, 58 input at 106 exceeds 580 millivolts, which is the reference voltage for comparator 98. Comparator 98 is, therefore, arranged to be in the high state before voltage at input 106 exceeds 580 millivolts. Thus when input 100 is in excess of 2.4 volts and the voltage drop across resistors 56 and 58 is less than 580 millivolts, the batteries of battery pack 10 are then at the predetermined desired charged potential, whereby both comparators 96 and 98 are high resulting in the charging of the capacitor 70. The voltage measuring device 68 thereby determines the voltage of the battery for very low current flows, i.e. a voltage drop across resistors 56 and 58 of less than 580 millivolts plus the voltage drop across the diode 16 at the point of current commencing to flow through or ceasing to flow through the diode. It is appreciated that the true voltage is, therefore, indicative of the battery plus the drop across the diode which is a known factor and can be compensated for in the setting of the resistor pack 102.

The outputs of the measuring devices 62 and 68 through the two sets of comparators, either independently or in combination, charge the capacitor 70 through the respective diodes 110 and 112. Resistor 92 determines the potential from the five volt source for charging the capacitor 70. Similarly, resistor 108 determines the potential from the other five volt source in charging the capacitor 70. It is appreciated that the system may be improved upon by having each comparator set feed its own capacitor with its own pull-down resistor and the resulting voltages on the capacitor combined by a pair of diodes into the comparator 114 which is part of the circuitry for tripping the SCR 52.

The circuitry for tripping the SCR 52 includes in combination with capacitor 70 a pull-down resistor 116. The reference voltage for comparator 114 is 2.4 volts. The input 118 for the comparator 114 is determined by the capacitor 70. The resistor 116 provides a current bleed while in the high charge mode which causes finite pulses from either of the measuring devices 62 and 68 to be required in order to terminate the high charge mode. Thus, over time with reference to FIG. 3, several spikes from the outputs of the comparator sets of measuring devices 62 and 68 gradually bring the capacitor 70 up to sufficient charge to trip the circuit. Accordingly with comparator 114, once the charge on capacitor 70 has developed to a level in excess of 2.4 volts, the output of comparator 114 goes high. This causes the current to flow in the opposite direction through resistor 116 to maintain the charge condition on the capacitor 70. The input 120 to comparator 122 causes the drive 126 via diode 124 for the SCR 52 to be removed from the SCR thereby opening the SCR and switching the charging voltage to a trickle charge as the charging voltage now passes through series resistor 56 and 58 until diode 128 conducts to remove larger resistor 58 from the trickle charge circuit during the peaks of the waveform of FIG. 3. The purpose of this resistor/diode arrangement is to avoid the problem that a single resistor would present in measuring temperatures. As discussed, the value of the thermistor is measured at quite low voltages where the resistor across the SCR 52 is the lower right element of the Wheatstone bridge. If, for purposes of obtaining an adequate trickle charge rate, the resistor has to be very low, the signals may be hard to deal with. A solution to this problem is to include an arbitrarily higher resistor 58 which effectively is taken out of the circuit by diode 128 when the current increases to a sufficient level in the charging waveform.

It is desired to operate an LED when the circuit has supply voltage available and is ready to accept a battery pack for purposes of charging. This is accomplished through resistor 130 in conjunction with transistor 132. Furthermore, it is desirable to indicate that, when the battery is being charged at full rate, the LED 134 is not lit. This is arranged by diode 136, capacitor 138 and resistor 140. These devices bypass the LED 134 until full battery charge occurs.

Once the battery pack is removed and a new battery is inserted or the same one reinserted, the charging system should commence again at high charge. This is accomplished by the input 142 to comparator 144 which senses that no current whatever is flowing with a reference input of 150 millivolts. In that event, the comparator 144 causes capacitor 70 to be reset to zero. A time delay circuit is included in this sequence involving resistor 146 and capacitor 148 to offset the effect of transients and also to provide a power-on time delay which holds capacitor 70 at zero until all voltages within the circuit have stabilized.

In the event of a main voltage failure, which may be quite short, it is desired that the same reset should take place. This is accomplished by diode 150 which dumps the charge on capacitor 70 onto the rapidly decaying five volt line as indicated. The remaining elements schematically shown in FIG. 5 are elements apparent to those skilled in the art which permit the functioning of the special components in the circuitry described herein.

Having thus described the details of the manner in which the circuitry of FIG. 5 functions, it will be appreciated by those skilled in the art that the function performed by the circuitry may be accomplished in many ways. Only the basic components of the circuit of FIG. 5 have been provided where the values for and electrical characteristics of the components would be readily apparent to one skilled in the art.

The circuitry as discussed in detail with respect to FIG. 5 provides by way of the diode 16 a device which effectively electrically removes the battery from the charging terminals, while the temperature measuring device 62 measures the temperature of the battery through thermistor 18. Furthermore, the diode 16 acts as a device to prevent discharge of the battery 10 during portions of the charging cycle when charging voltage is at a potential less than the instantaneous battery voltage. When the battery is removed from the charging system, the diode 16 also prevents discharge of the battery through the charging terminals 12 and 14. As discussed with respect to FIG. 2, it is appreciated that other semiconductor devices may be used which will selectively permit either charging of the battery through terminals 12 and 14 or a discharge of the batteries through terminals 12 and 14 when a load is required. This may be very useful in situations where power tools, miner's lamps, and the like can be charged and discharged through the same two terminals provided that adequate safety precautions are taken. The circuitry also provides in battery pack 10 a two-terminal system for the battery pack which enables both temperature and battery voltage measurement by combined use of a discharge-prevention device in the form of a diode 16 which is in series with the battery and a temperature sensing device which is in parallel with the serial arrangement for the diode and battery and is also associated with the charging terminals 12 and 14 of the battery pack.

Although preferred embodiments of the invention have been described herein in detail, it will be understood by those skilled in the art that variations may be made thereto without departing from the spirit of the invention or the scope of the appended claims.

What is claimed is:

1. In a method of charging a battery of a two-terminal battery pack through the corresponding two charging terminals of said battery pack by supplying charging voltage to said two charging terminals from a charging circuit, said charging circuit having terminals connectable to said two charging terminals, respectively, to supply said charging voltage, providing said charging circuit with an electrical battery temperature measuring means in association with said two charging terminals, measuring battery temperature, and separating said two charging terminals from said charging circuit terminals after said battery is charged to a desired level, the improvement comprising:

effectively electrically removing said battery from said charging terminals while electrically measuring battery temperature through said two charging terminals by said electrical measuring means.

2. The method of claim 1, further comprising charging said battery at high charge rate and switching to a trickle charge when measured temperature of said battery exceeds a predetermined value.

3. The method of claim 2, further comprising charging said battery with a charging voltage having a potential which is varied over time.

4. The method of claim 3, further comprising removing said battery electrically from said terminals during periods when charging voltage is below instantaneous battery voltage.

5. The method of claim 4, further comprising measuring battery temperature during a portion of said period when charging voltage is appreciably different from zero.

6. In a method of charging a battery of a two-terminal battery pack through the corresponding two charging terminals of said battery pack by supplying charging voltage to said two charging terminals from a charging circuit, said charging circuit having terminals connectable to said two charging terminals, respectively, to supply said charging voltage, measuring battery temperature using an electrical battery temperature measuring means in association with said two charging terminals, and separating said two charging terminals from said charging circuit terminals after said battery is charged to a desired level, the improvement comprising:
- providing said battery pack in an enclosure with said two charging terminals exterior of said enclosure for separate electrical contact with said two charging circuit terminals;
- providing said temperature measuring means to include means for sensing battery temperature;
- providing said sensing means within said battery enclosure adjacent to said battery, said sensing means being electrically coupled to said two charging terminals; and
- effectively electrically removing said battery from said charging terminals while electrically measuring battery temperature through said two charging terminals by said sensing means.

7. The method of claim 6, further comprising:
- providing a plurality of cells in series to constitute said battery in said battery pack within said enclosure; and
- electrically coupling said cells in series with said two charging terminals.

8. The method of claim 7, wherein said cells are rechargeable nickel cadmium cells.

9. The method of claim 6, further comprising using said charging voltage to determine a characteristic of said sensing means which is indicative of said battery temperature.

10. The method of claim 9, further comprising:
- charging said battery pack with said charging voltage having a potential which is varied over time; and
- removing said battery pack electrically from said terminals and applying said charging voltage to said temperature sensing means during periods when charging voltage is lower than instantaneous battery voltage.

11. The method of claim 10, further comprising establishing a portion of said period during which said characteristic of said sensing means is determined by applying said charging voltage to said temperature sensing means.

12. The method of claim 11, wherein said charging voltage is derived from an AC source.

13. The method of claim 11, wherein said charging voltage is a unipolar voltage derived from an AC or a rectified AC source.

14. The method of claim 11, further comprising supplying said charging voltage from a DC source which is intermittently varied.

15. In a method of charging a battery of a two-terminal battery pack through the corresponding two charging terminals of said battery pack by supplying charging voltage to said two charging terminals from a charging circuit, said charging circuit having terminals connectable to said two charging terminals, respectively, to supply said charging voltage, providing said charging circuit with an electrical battery temperature measuring means in association with said two charging terminals, measuring battery temperature, and separating said two charging terminals from said charging circuit terminals after said battery is charged, the improvement comprising:
- effectively electrically removing said battery from said charging terminals while electrically measuring battery temperature through said charging terminals by said electrical measuring means;
- intermittently changing said charging voltage applied to said charging terminals to a potential less than the battery potential to cause a falling off and a subsequent rise in said charging voltage;
- preventing discharge of said battery through said charging terminals by discharge prevention means; and
- detecting said charging voltage while current commences to flow or is about to cease flowing through said discharge prevention means to determine the voltage of said battery.

16. The method of claim 15, further comprising charging said battery at a high charge rate and switching to a trickle charge upon detecting battery voltage at a predeterminedd battery potential.

17. The methon of claim 16, wherein said charging voltage is derived from an AC source.

18. The method of claim 17, further comprising establishing a brief period while current commences to flow or is about to cease flowing through said discharge prevention means during which said potential of said charging voltage is detected.

19. In a method for detecting battery temperature of a two charging terminal battery pack during a charging cycle for said battery and switching to a trickle charging cycle for said battery when a predetermined temperature for said battery is detected, connecting said two charging terminals to two corresponding terminals of a charging circuit, and disconnecting said battery from said charging circuit terminals after said battery is charged to a desired level, providing electrical means responsive to change in battery temperature, said electrical means changing a detectable electrical characteristic thereof in response to increase in battery temperature, said electrical means being associated with said two charging terminals, the improvement comprising:
- intermittently applying a detecting voltage to said battery charging terminals which is less than the instaneous battery voltage;
- preventing discharge of said battery through said charging terminals during the application of said detecting voltage to said charging terminals, said detecting voltage being applied to said electrical means independent of said battery;
- detecting a change in said electrical characteristic when said detecting voltage is applied to said electrical means where a detected change in said electrical characteristic is in response to a change in said batery temperature; and
- switching to said trickle charging cycle in response to detecting a predetermined upper limit for battery temperature.

20. The method of claim 19, wherein said detecting voltage is derived from an AC source.

21. The method of claim 19, wherein said detecting voltage is a portion of a rectified AC charging voltage less than instantaneous battery voltage.

22. The method of claim 19, further comprising applying a DC charging voltage, said DC charging voltage being intermittently varied to provide said detecting voltage.

23. The method of claim 19, further comprising applying a DC charging voltage wherein said detecting voltage is a DC voltage of reverse polarity from said DC charging voltage.

24. The method of claim 21, further comprising establishing alimited time frame during which a change in said electrical characteristic is detected while applying said detecting voltage to said electrical means.

25. The method of claim 21, wherein:
said battery pack is provided in an enclosure;
said electrical means is positioned adjacent said battery;
said two charging terminals are provided exterior of said enclosure; and
said electrical means are electrically coupled to said two charging terminals;
said method further comprising measuring battery temperature through said charging terminals by electrical means.

26. The method of claim 25, wherein said electrical means is a thermistor, said method further comprising passing said detecting voltage through said thermistor and, upon determining a reduced value of resistance for said thermistor corresponding to said upper limit for battery temperature, switching to said trickle charge.

27. The method of claim 26, further comprising:
applying a charging voltage to said battery across said terminals, said charging voltage being changed to cause a falling off and a subsequent rise in said charging voltage;
detecting the potential of the charging voltage while current commences to flow or is about to cease flowing through a battery discharge prevention means; and
switching to said trickle charging cycle upon detecting said potential of the charging voltage corresponding to predetermined recharged voltage for said battery.

28. The method of claim 27, further comprising connecting a diode means in series with said battery and said two charging terminals in a manner to prevent discharge of said battery while portions of said rectified AC voltage are below battery voltage.

29. The method of claim 28, further comprising connecting sasid thermistor between said two charging terminals and in parallel with said series arrangement of said diode means and battery.

30. In an apparatus for charging battery of a two terminal battery pack through its corresponding two charging terminals by connecting said two terminals with two corresponding terminals of a battery charging circuit of said apparatus, said charging circuitry having means for supplying a charging voltage to said two charging terminals, electrical means for measuring battery temperature which are associated with said two charging terminals, respectively, said battery temperature meauring means inclluding means for sensing battery temperature, said sensing means being adjacent said battery and electrically connected to said two charging terminals during battery charging, said charging terminals being separable from said two charging circuit terminals, the improvement comprising:
means for effectively electrically removing said battery from said charging terminals while said measuring means measures battery temperature by applying a voltage on said sensing means via said two charging terminals.

31. The apparatus of claim 30, wherein said measuring means includes means for establishing an operative period during which electrical current passing through said sensing means is operatively detected by said measuring means in measuring battery temperature.

32. The apparatus of claim 30, further comprising means for actuating a trickle charge on said battery when measured battery temperature achieve a predetermined upper limit.

33. The apparatus of claim 30, said charging voltage supply means provides a charging voltage which is varied over time.

34. The apparatus of claim 33, wherein said battery removal means electrically removes said battery from said charging terminals when said charging voltage is less than instaneous battery voltage.

35. The apparatus of claim 34, wherein said charging voltage supply means provides a rectified AC charging voltage.

36. The apparatus of claim 34, wherein said charging voltage supply means provides a DC charging voltage which is intermittently changed.

37. The apparatus of claim 33, further comprising an enclosure for said battery pack with said two charging terminals exterior of said enclosure for separate electrical contact with said corresponding terminals of said charging circuit, said sensing means being provided in said enclosure adjacent said battery, and said sensing means being electrically coupled to said exterior battery charging terminals.

38. The apparatus of claim 37, wherein said battery comprises a plurality of individual cells connected in series.

39. The apparatus of claim 38, wherein said individual cells include rechargeable nickel cadmium cells.

40. The apparatus of claim 37, wherein:
said battery removal means electrically removes said battery from said charging terminals during periods when said charging voltage is less than instantaneous battery voltage; and
said charging voltage is applied to said sensing means to enable said measuring means to measure battery temperature at least during said periods.

41. The apparatus of claim 40, further comprising means for establishing when during said periods said measuring means measures battery temperature.

42. The apparatus of claim 41, wherein said charging voltage supply means provides a rectified AC charging voltage.

43. The apparatus of claim 30, wherein:
said charging voltage supply means intermittently varies said charging voltage applied to said charging terminals to a potential less than the potential of the battery to cause a falling off and a subsequent rise in charging voltage;
said apparatus further comprising means for preventing discharge of said battery through said two charging terminals; and
means for detecting the potential of said charging voltage while current commences to flowor is about to cease flowing through said discharge prevention means to thereby determine the voltage of said battery being charged.

44. The apparatus of claim 43, wherein said discharge prevention means comprises a diode in series with said battery terminals.

45. The apparatus of claim 44, wherein said charging voltage supply means provides a rectified AC charging voltage.

46. The apparatus of claim 44, further comprising means for establishing a brief period during which said detecting means operably detects battery voltage while charging current commences to flow through or is about to cease flowing through said diode.

47. The apparatus of claim 46, wherein said sensing means comprises a thermistor which is connected in parallel with said diode and across said battery terminals.

48. The apparatus of claim 37, wherein:
said charging voltage supply means provides a rectified AC charging voltage;
said sensing means is adapted to change a detectable electrical characteristic thereof in response to increase in battery temperature, said supply means applying said rectified AC charging voltage to said sensing means to thereby apply said voltage on said sensing means;
first electronic comparator means for detecting whether said detectable electrical characteristic of said sensing means has changed;
a second electronic comparator means for establishing a brief period during which said first comparator means is operable in detecting a change in said detectable electrical characteristic, said second comparator means establishing said brief period during phases of said rectified AC charging voltage which are at a potential less than the instantaneous voltage of said battery.

49. The apparatus of claim 48, wherein:
said sensing means compriss a thermistor which is connected in parallel with said battery and across said battery pack terminals;
said battery removing means comprises a diode connected in series with said battery and said terminals and in parallel with said thermistor, said diode being forward conducting when said charging voltage exceeds the instaneous voltage of said battery, and said diode preventing discharge of said battery when said charging voltage is less than the instantaneous battery;
means for detecting a cchange in resistance of said thermistor, said detector means having an input to said first comparator means, said first comparator means being adapted to switch states in response to an input from said detector means which indicates that battery temperature has reached a predetermined level;
means for inputting to said second comparator means a voltage representative of said charging voltage, said second comparator means only switching states and maintaining that state for said brief period; and
means for switching said charging voltage to a trickle charge in response to said first and second comparator means when both indicate each said brief period of continuous charging cycle that said battery is at said predetermined temperature.

50. The apparatus of claim 49, further comprising means for detecting the potential of said charging voltage while current commences to flow or is about to cease flowing through said diode.

51. The apparatus of claim 50, further comprising:
a third electronic comparator means;
means for inputting to said third comparator means a voltage representative of said charging voltage;
a fourth electronic comparator means;
means for inputting to said fourth comparator means a voltage representative of a voltage drop across a resistor determined by current commencing to flow or about to cease flowing through said diode;
said fourth comparator means switching states and remaining in said state during a brief period that said current is commencing to flow or is about to cease flowing through said diode;
said third comparator means switching states and remaining in said state while said charging voltate is at at least as large as a predetermined voltage of said battery; and
said means for switching to said trickle charge being responsive to both said third and fourth comparator.

52. The apparatus of claim 51, wherein said means for switching to trickle charge provides a time delay before switching to said trickle charge in response to combined outputs over time of at least one of said first and second comparator means and said third and fourth comparator means.

53. A rechargeable battery pack having a battery, two charging terminals and a thermistor in parallel with said battery, said thermistor being responsive to change in battery temperature, and said thermistor associated with said two charging terminals, the improvement comprising:
a diode in series with said battery and in parallel with said thermistor for preventing discharge of said battery through said two charging terminals, said battery comprising a plurality of cells connected in series and contained in an enclosure, said two charging terminals being exterior of said enclosure, said thermistor being within said enclosure adjacent one or more of said cells.

54. The rechargeable battery pack of claim 53, wherein said cells include rechargeable nickel cadmium cells.

* * * * *

UNITED STATES PATENT AND TRADEMARK OFFICE
CERTIFICATE OF CORRECTION

PATENT NO. : 4,649,333
DATED : March 10, 1987
INVENTOR(S) : Derek V. Moore

It is certified that error appears in the above-identified patent and that said Letters Patent is hereby corrected as shown below:

Please correct the above-identified patent application as follows:

Claim 29, Column 13; line 39, change "sasid" to --said--;

Claim 30, Column 13, line 51; change "meauring" to --measuring--;

Claim 30, Column 13, line 51; change "inclluding" to --including--;

Claim 43, Column 14, line 54, change "flowor" to --flow or--;

Claim 49, Column 15; line 26, change "compriss" to --comprise--;

Claim 49, Column 15; line 33, change "instaneous" to --instantaneous--;

UNITED STATES PATENT AND TRADEMARK OFFICE
CERTIFICATE OF CORRECTION

PATENT NO. : 4,649,333
DATED : March 10, 1987
INVENTOR(S) : Derek V. Moore

It is certified that error appears in the above-identified patent and that said Letters Patent is hereby corrected as shown below:

Claim 49, Column 15; line 37, change "cchange" to
--change--.

Signed and Sealed this

First Day of September, 1987

Attest:

Attesting Officer

DONALD J. QUIGG

Commissioner of Patents and Trademarks